(12) United States Patent
Jierapipatanakul et al.

(10) Patent No.: US 6,288,867 B1
(45) Date of Patent: Sep. 11, 2001

(54) COUNTER BALANCE DISC SPACER FOR HARD DISC DRIVES

(75) Inventors: Niroot Jierapipatanakul; Michael Joo Chiang Toh; Beng Wee Quak; Chee Suan Low, all of Singapore (SG)

(73) Assignee: Seagate Technology Inc., Scotts Valley, CA (US)

( * ) Notice: Subject to any disclaimer, the term of this patent is extended or adjusted under 35 U.S.C. 154(b) by 0 days.

(21) Appl. No.: 09/246,330

(22) Filed: Feb. 9, 1999

Related U.S. Application Data

(60) Provisional application No. 60/092,627, filed on Jul. 13, 1998.

(51) Int. Cl.[7] .................................................. G11B 17/08
(52) U.S. Cl. .......................................................... 360/98.08
(58) Field of Search ............................... 360/98.08, 99.12

(56) References Cited

U.S. PATENT DOCUMENTS

| | | | |
|---|---|---|---|
| 5,504,638 | * 4/1996 | Kinoshita et al. | 360/98.08 |
| 5,836,367 | * 11/1998 | Calabrese | 138/112 |
| 5,880,905 | * 3/1999 | Kazierczak et al. | 360/98.08 |
| 5,940,244 | * 8/1999 | Canlas et al. | 360/98.08 |

* cited by examiner

Primary Examiner—David Davis
(74) Attorney, Agent, or Firm—Schwegman, Lundberg, Woessner & Kluth, P.A.

(57) ABSTRACT

An information handling system, such as a disc drive, including a base, a disc stack rotatably attached to the base, and an actuator assembly movably attached to the base. The disc stack assembly includes a spindle hub rotatably coupled to the disc drive. The spindle hub has an axis of rotation about which the disc stack assembly rotates. The spindle hub includes a cylindrical portion. The disc stack assembly also includes a clamp, a disc spacer, and a disc coupled to a spindle hub. The disc spacer has an opening therein dimensioned to receive the cylindrical portion of the spindle hub. The disc spacer is asymmetrical and positioned to counter balance a mass offset in the disc stack assembly. The asymmetrical disc spacer also includes a registration surface. The registration surface is on the outer perimeter of the disc spacer. The disc spacer has a center of mass offset from the axial centerline of the opening. The disc spacer is used to counter the center of mass offset of the disc stack assembly. Typically, balancing the disc stack assembly requires that the center of mass of the spacer is on one side of the axis of rotation of the hub and the center of mass of the disc stack assembly is on the other side of the axis of rotation of the hub. The flat surface of the asymmetrical disc spacer is positioned so the plane of the flat surface intersects a plane defined by the axial centerline of the disc stack assembly and a point associated with the mass offset of the disc assembly.

16 Claims, 6 Drawing Sheets

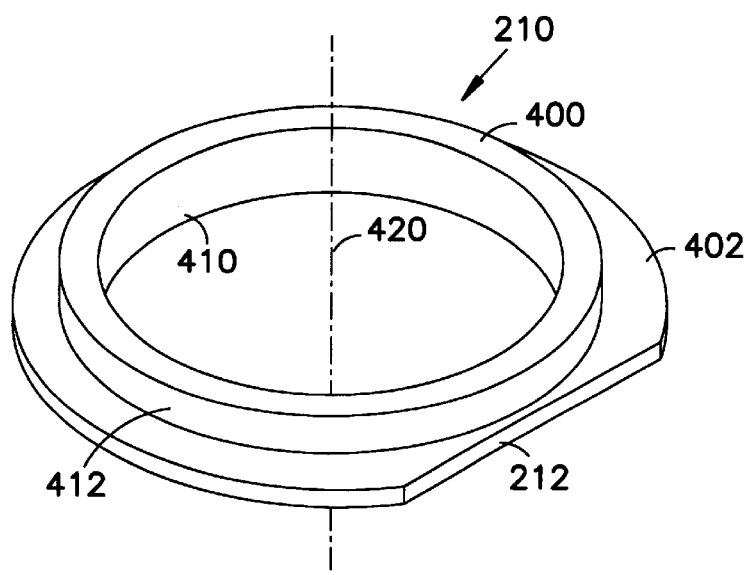
FIG. 4
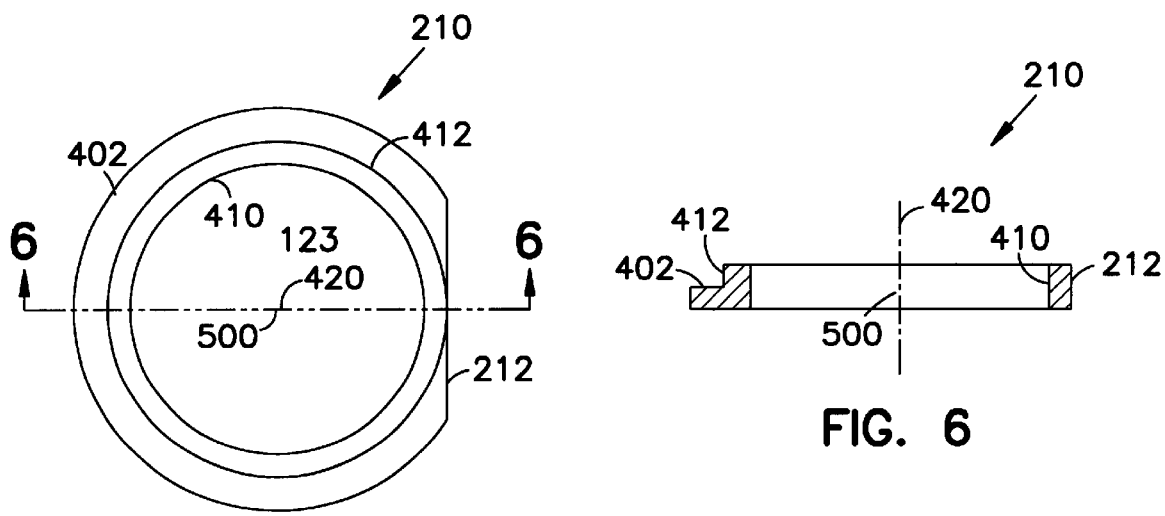
FIG. 5
FIG. 6

COUNTER BALANCE DISC SPACER FOR HARD DISC DRIVES

RELATED APPLICATION

This application claims the benefit of U.S. Provisional Application Serial No. 60/092,627 filed Jul. 13, 1998 under 35 USC119(e).

FIELD OF THE INVENTION

The present invention relates to the field of mass storage devices. More particularly, this invention relates to balancing a disc pack assembly about a disc spindle axis of rotation.

BACKGROUND OF THE INVENTION

One of the key components of any computer system is a place to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

Information representative of data is stored on the surface of the memory disc. Disc drive systems read and write information stored on tracks on memory discs. Transducers, in the form of read/write heads attached to the sliders, located on both sides of the memory disc, read and write information on the memory discs when the transducers are accurately positioned over one of the designated tracks on the surface of the memory disc. The transducer is also said to be moved to a target track. As the memory disc spins and the read/write head is accurately positioned above a target track, the read/write head can store data onto a track by writing information representative of data onto the memory disc. Similarly, reading data on a memory disc is accomplished by positioning the read/write head above a target track and reading the stored material on the memory disc. To write on or read from different tracks, the read/write head is moved radially across the tracks to a selected target track. The data is divided or grouped together on the tracks. In some disc drives, the tracks are a multiplicity of concentric circular tracks. In other disc drives, a continuous spiral is one track on one side of a disc drive. Servo feedback information is used to accurately locate the transducer. The actuator assembly is moved to the required position and held very accurately during a read or write operation using the servo information.

The transducer is typically housed within the slider. The slider is a small ceramic block which is passed over the disc in a transducing relationship with the disc. The small ceramic block, also referred to as a slider, is usually aerodynamically designed so that it flies over the disc. Most sliders have an airbearing surface ("ABS") which includes rails and a cavity between the rails. When the disc rotates, air is dragged between the rails and the disc surface causing pressure, which forces the head away from the disc. At the same time, the air rushing past the depression in the air-bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular fly height. The fly height is the thickness of the air lubrication film or the distance between the disc surface and the transducing head. This film eliminates the friction and resulting wear that would occur if the transducing head and disc were in mechanical contact during disc rotation. In some disc drives, the slider passes through a layer of lubricant rather than flying over the surface of the disc.

When the disc is operating, the disc is usually spinning at relatively high revolutions per minute ("RPM"). These days common rotational speeds are 7200 RPM. Rotational speeds in high performance disc drives are as high as 10,000 RPM. Higher rotational speeds are contemplated for the future. These high rotational speeds allows for shorter access times. In other words, as the disc spins faster, the performance of the disc drive is improved since the time necessary to access a particular piece of information on the drive is shortened. Shorter access times are a constant goal of designers and manufacturers of disc drives.

Higher rotational speeds also make the disc drive more susceptible to vibration due to unbalanced rotating parts. As a result, part of the assembly process typically includes the balancing of parts that will rotate within the disc drive. The main rotating part within a disc drive is the disc stack assembly. The disc stack assembly is one or more discs fastened to a spindle hub. Disc spacers and clamps are used to attach the discs to the spindle hub. A spindle motor is used to rotate the hub and disc stack assembly.

It is very important to have a balanced disc pack as an out-of-balance condition results in many problems in a disc drive. One problem associated with an unbalanced disc pack is that it vibrates and causes noise. An unbalanced disc pack also stresses the bearings between the rotating portion of the hub and the spindle shaft. Stressed bearings have a shorter life which may be less than the stated life of the disc drive. An unbalanced disc pack also causes erratic speed variations between the transducing head and the tracks on the disc. These speed variations may result in read/write errors. Planar and axial vibrations of the disc surfaces may also contribute to head crashes.

In addition, planar vibrations or vibrations which travel in the plane of the data surface of the disc make track following of the transducing head difficult. In other words, when the disc stack vibrates in a planar direction, the track to be followed will pass transverse to the tracking direction of the transducing head. The problem is magnified by the fact that the tracks are very closely spaced. In today's disc drives, track densities of 10,000 tracks per inch are common. Six tracks fit on a human hair. This problem will only get worse as time marches on since higher track densities are contemplated for the future. In other words, disc drive performance is boosted by packing the tracks more closely together. The more tracks a disc has, the more information representing data that can be stored. Furthermore, if the vibrational mode has a frequency which is higher than the frequency at which servo sectors are read, the head can cross the track several times between servo sectors.

Prior attempts to solve the unbalanced disc pack problems involved designing and manufacturing discs and hubs to tight tolerances to attain as close a fit between the inner diameter of the discs and the outer diameter of the hub in an attempt to center the rotating mass with respect to the axis of rotation of the disc assembly. This still resulted in out-of-balance conditions because of the inability to attain perfect fits and uniformly balanced discs. To obtain better balance, balance rings were used. By either adding or removing material from the balancing ring as indicated by sophisticated balancing equipment better balance was obtained, but at the expense of further steps following assembly of the disc packs.

U.S. Pat. No. 4,358,803 to Van Der Giessen describes accurately machined inner walls of disc central openings and a centering element which cooperates with at least one of the inner walls to center discs. In U.S. Pat. No. 4,224,648 to Roling, centering was performed using a steel centering ball in the center of a disc pack having a hemispherical surface facing a spindle cup. Centering with respect to the inner walls of a disc does not ensure that the disc is centered with respect to the majority of rotating mass of the discs which lies almost entirely outside the inner wall of the disc. The outer diameter of a disc may not be perfectly concentric with the inner diameter of the disc. Thus, centering with respect to the inner diameter of the discs requires high precision in aligning discs before the fastening of the discs to the hub and neglects some of the major causes of imbalance.

The above methods of centering and fastening discs to form a disc pack also lead to particle generation which degrades performance of disc drives and may even cause a head crash. Mating surfaces, such as the machined inner walls of disc central openings and the centering element in U.S. Pat. No. 4,358,803 and the steel ball and spindle cup in U.S. Pat. No. 4,224,648 are designed to slide while subjected to pressures until mating occurs. This sliding produces undesirable particles.

Another disc pack assembly method for use in a disc drive is taught in U.S. Pat. No. 4,683,505 issued to Schmidt et al. In U.S. Pat. No. 4,683,505 the disc pack has discs which are alternately diametrically offset about a spindle axis of rotation. The discs are positioned as a function of their outer edges such that alternate opposite outer edges line up as though they were the outer edges of centered nominal diameter discs. This results in an increase in the number of axial nodal points for potential imbalance moments and reduces the amplitude of associated vibrations. Disc spacers are also alternately diametrically offset about the spindle axis so that pairs of like components tend to balance each other to minimize potential vibrations. The problem with this solution is that it requires an even number of discs in the disc stack. In addition, the solution does not work in disc stacks having one disc since there is no other disc to counter balance with the only disc. Many of the other solutions require long cycle times which are not favorable to manufacturing.

Thus, there is a need for a method and apparatus for balancing the disc pack having only a single disc. There is also a need for a method that is easy to assemble and easy to manufacture. There is also a need for a method which does not generate particles.

SUMMARY OF THE INVENTION

An information handling system, such as a disc drive, includes a base, a disc stack rotatably attached to the base, and an actuator assembly movably attached to the base. The disc stack assembly includes a spindle hub rotatably coupled to the disc drive. The spindle hub has an axis of rotation about which the disc stack assembly rotates. The spindle hub includes a cylindrical portion. The disc stack assembly also includes a clamp, a disc spacer, and a disc coupled to spindle hub. The disc spacer has an opening therein dimensioned to receive the cylindrical portion of the spindle hub. The disc spacer is asymmetrical and positioned to counter balance a mass offset in the disc stack assembly. The asymmetrical disc spacer also includes a registration surface. The registration surface is on the outer perimeter of the disc spacer. The disc spacer has a center of mass offset from the axial centerline of the opening. The disc spacer is used to counter the center of mass offset of the disc stack assembly. Typically, balancing the disc stack assembly requires that the center of mass of the spacer is on one side of the axis of rotation of the hub and the center of mass of the disc stack assembly is on the other side of the axis of rotation of the hub. The flat surface of the asymmetrical disc spacer is positioned so the plane of the flat surface intersects a plane defined by the axial centerline of the disc stack assembly and a point associated with the mass offset of the disc assembly.

Advantageously, the asymmetrical disc spacer can be used to balance a disc stack which has only one disc. In addition, the asymmetrical disc spacer can also be used to balance a disc stack which has a plurality of discs. The method is easy to use. This eases assembly and eases the manufacturing process. The method also generates minimal particles since the disc clamp is not machined during the balancing process and the flat side is formed to be a registration surface. The flat side provides a simple but effective way of allowing the tool that performs the disc spacer offset to engage on the surface and at the same time automatically align the spacer in the desired orientation. The asymmetrical disc spacer also minimizes material wastage which reduces the cost of the part.

BRIEF DESCRIPTION OF THE DRAWINGS

FIG. 4 is a perspective view of a disc spacer ring.

FIG. 5 is a top view of the asymmetrical spacer ring.

FIG. 6 is a cutaway view of the asymmetrical spacer ring along line 6—6 in FIG. 5.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
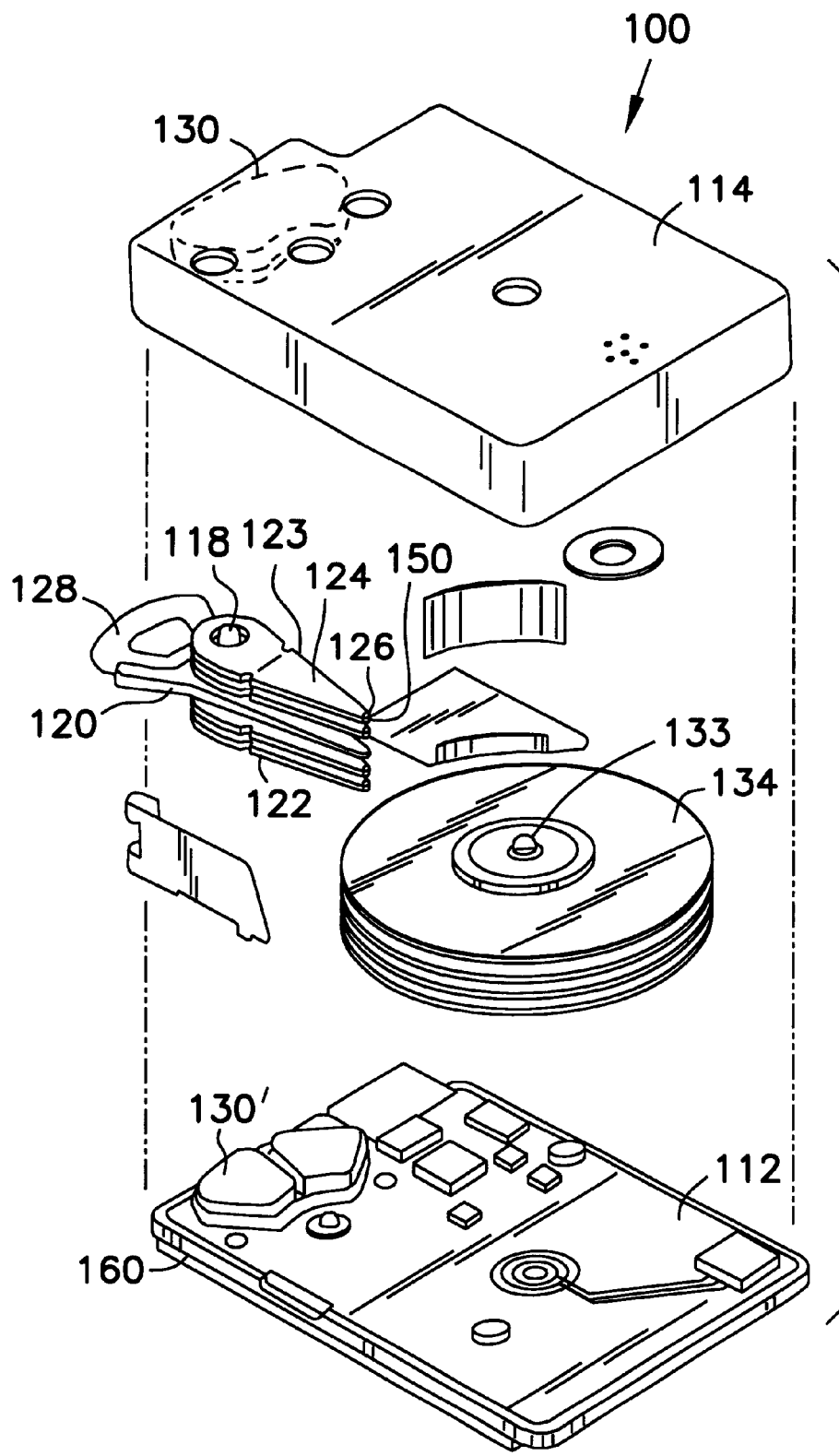
FIG. 1 is an exploded view of a disc drive with a multiple disc stack and a ramp assembly for loading and unloading transducers to and from the surfaces of the discs.

The invention described in this application is useful with all mechanical configurations of disc drives having either rotary or linear actuation. In addition, the invention is also useful in all types of disc drives including hard disc drives, ZIP removeable media drives, floppy disc drives and any other types of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a pair of magnets 130. The pair of magnets 130, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc.

Figure 2:
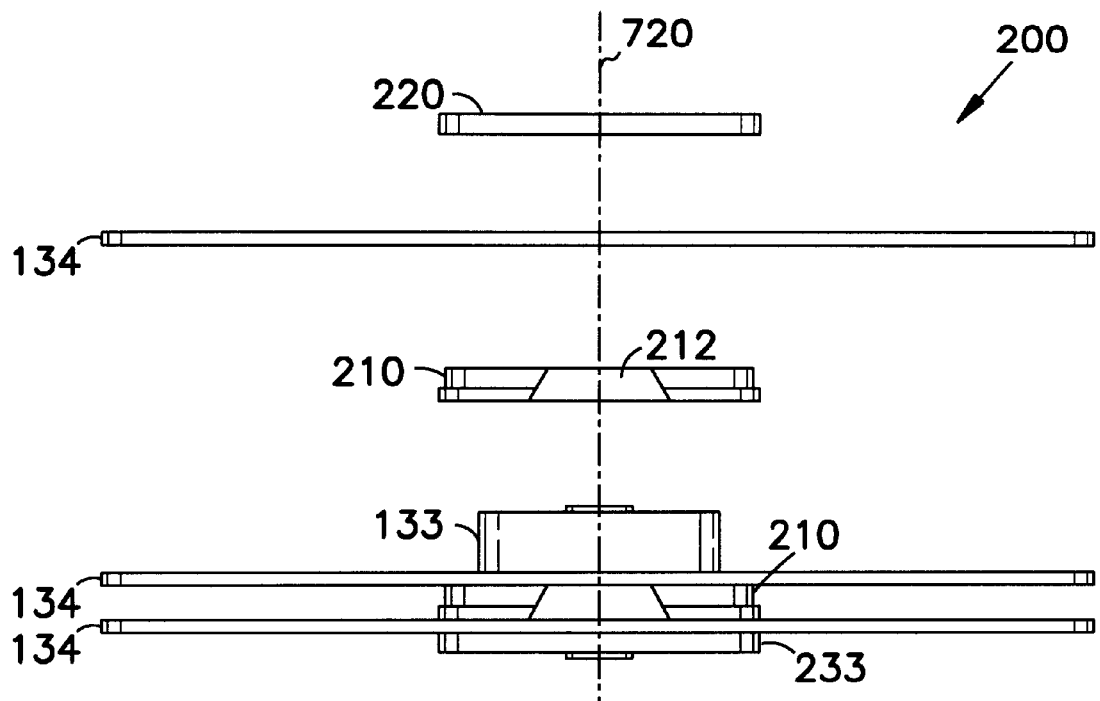
FIG. 2 is a side view of a spindle hub with a plurality of attached discs and a plurality of disc spacers which form a disc stack assembly.

FIG. 2 is a side view of a spindle hub 133 with a plurality of attached discs 134 and a plurality of disc spacers 210 which form a disc stack assembly 200. The disc stack assembly 200 also includes a disc clamp 220 which attaches the discs 134 and the spacers 210 to the hub 133. The hub 133 includes a mounting flange 233. Initially the spacer 210 is placed on the mounting flange 233. Thereafter, disc 134 is placed onto the spindle hub 133. Once a selected number of discs 134 and spacers 210 are placed on the spindle hub 133, the disc clamp is used to place an axial load onto the discs and disc spacers as well as to attach to the spindle hub 133. In this particular embodiment the disc clamp 220 is a screw type disc clamp. As is shown in FIG. 2, the disc spacers 210 include a flat surface 212. The flat surface 212 serves as a tool registration surface, or a tool used to balance the disc stack assembly 200 during manufacture. The flat surface 212 also makes the spacer ring 210 physically asymmetrical in appearance. As shown in FIG. 2, the spacer ring 210 can be used in disc stack assemblies 200 which include a plurality of discs 134.

Figure 3:
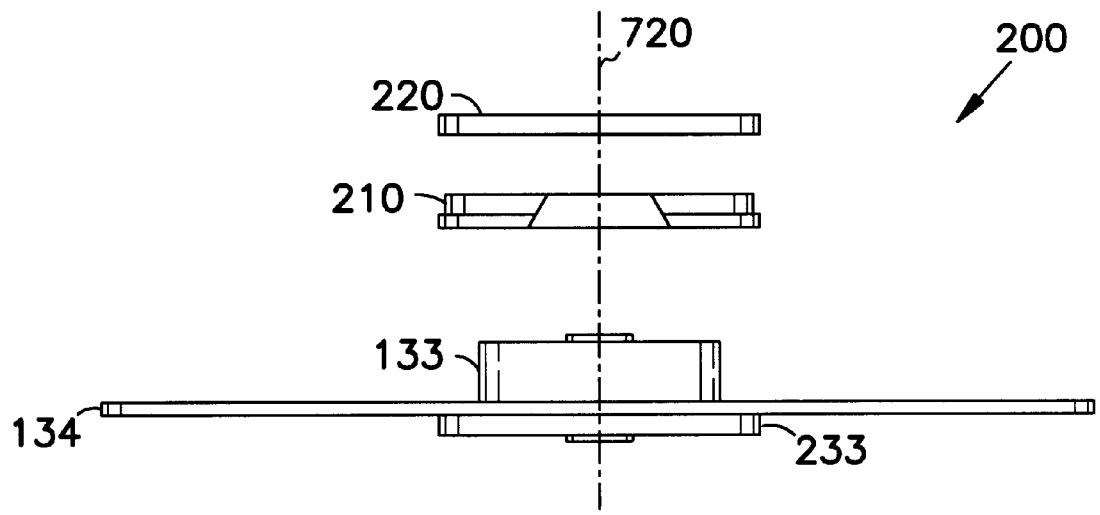
FIG. 3 is a side view of a spindle hub with a single attached disc and a disc spacer which forms a disc stack assembly.

FIG. 3 is a side view of a spindle hub 133 with a single disc 134 and a single disc spacer 210 attached to the hub 133. The disc stack assembly 200 shown in FIG. 3 illustrates that the spacer 210 can be used in a disc drive design with a single disc 134. The disc 134 is placed onto the hub 133 and against the mounting flange 233 of the hub 133. Then the spacer 210 is positioned over the disc 134 and around the hub 133. A clamp 220 is then used to hold the disc 134 and disc spacer 210 to the hub, as well as to apply an axial force to the disc spacer 210 and the hub 133. The use of the asymmetrical spacer 210 is very useful in balancing a disk stack that includes a single disk, such as the disk stack shown in FIG. 3.

FIG. 4 is a perspective view of the disc spacer ring 210 having a flat surface 212. The disc spacer 210 includes an annular main body 400 and a lip 402. The annular main body 400 includes an inner diameter 410 and an outer diameter 412. The annular main body 400 also has an axial center line 420. The flat surface 212 is formed from a portion of the lip 402 of the spacer 210. It is contemplated that the flat surface 212 can extend to form a flat on the outer diameter 412 of the annular main body 400. The position of the flat surface 212 will vary dependent upon how far designers will want the center of mass or center of gravity to shift from the axial center line of the disc spacer. The amount of shift will depend upon the design of the disc drive and the components used in the disc stack assembly 200.

Now turning to FIGS. 5 and 6, the offset between the center of gravity or center of mass and the axial center line of the disc spacer 210 is shown. FIG. 5 is a top view of the asymmetrical spacer ring 210. FIG. 6 is a cutaway side view of the asymmetrical spacer ring 210 along the line 66 of FIG. 5. The center of gravity or the center of mass of the disc spacer ring 210 is depicted by reference numeral 500. As can be seen, the center of gravity or center of mass 500 is shifted away from the axial center line 420 of the disc spacer 210, making the disc spacer 210 asymmetrical shifts the center of gravity 500 from the axial center line 420 in a direction away from the flat surface 212. Thus, the physical asymmetry also provides for a shifting of the center of mass or center of gravity 500 away from the axial center line of the disc spacer 210. This could be termed as producing a mass bias direction, or biasing the mass away from the axial center line of the disc spacer 210. The direction of the mass shift is away from the flat portion 212 of the disc spacer 210.

Figure 7:
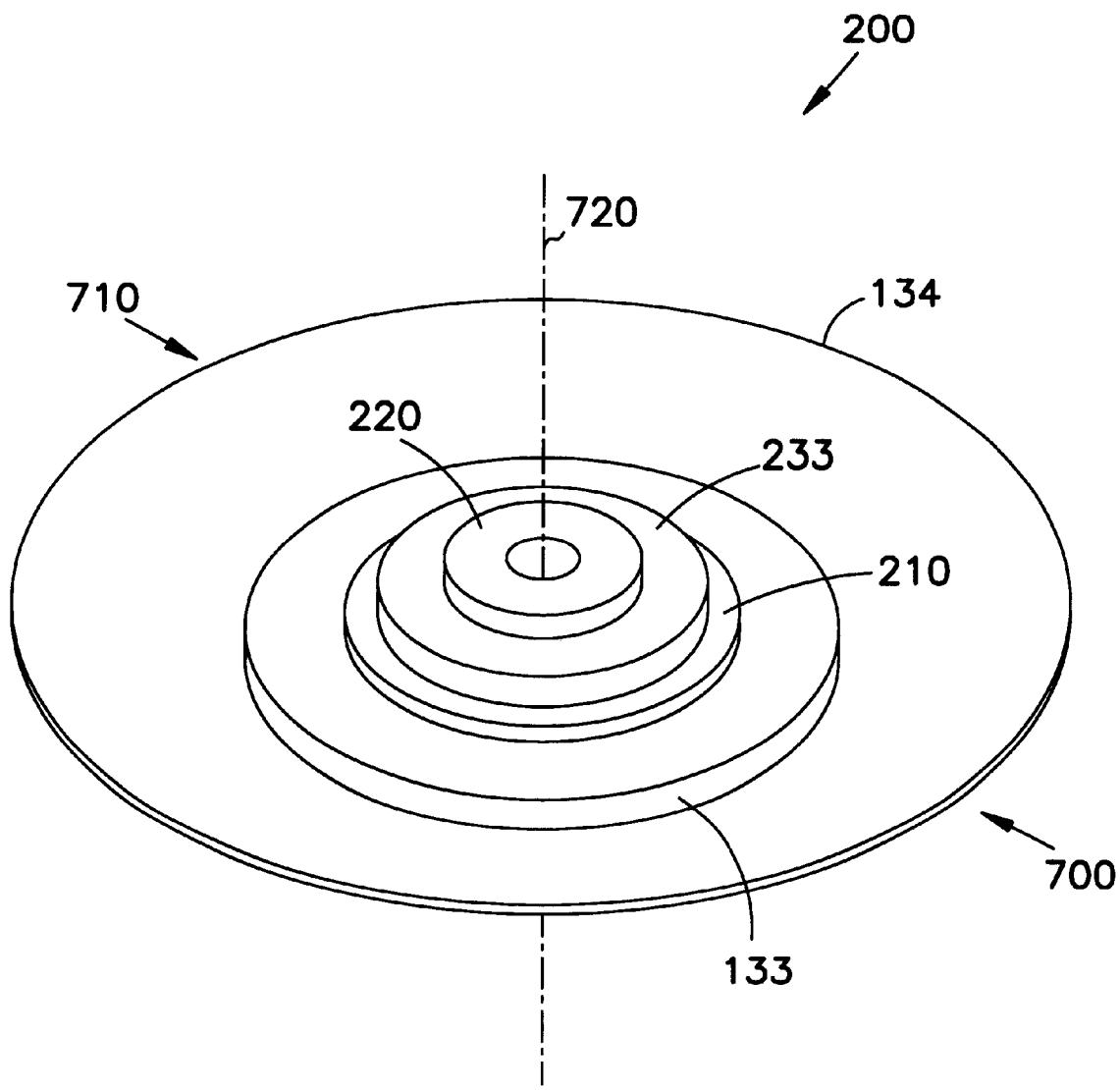
FIG. 7 is a perspective view of a spindle hub with an attached disc which forms a disc stack assembly.

FIG. 7 shows a perspective view of the spindle hub 133 with an attached disc 134 forming a disc stack assembly 200. The disc 134 is cutaway and removed for clarity so that the mounting flange 233, the hub 133, the disc spacer 210 and the disc clamp 220 can be clearly seen. The spindle assembly 200 also has an axial center line 720. Typically, the axial center line 720 corresponds to the axis of rotation of the spindle hub 133, or of the entire disc stack assembly 200.

Also shown in FIG. 7 is a first bias direction 700 and a second bias direction 710. The first bias direction 700 is associated with the movement of the center of gravity 500 from the axial center line 420 on the disc spacer. In other words, the first bias direction 700 is the direction in which the center of gravity 500 has been shifted for the disc spacer 210. The second bias direction 710 is the shift of the center of gravity from the axial center line of the disc stack 200 that results from the imbalances inherent with the parts that form the disc stack 200. The second bias direction 710 can also be thought of as the imbalance of the discs 134, the hub 133, and the disc clamp 220. The imbalance of these parts as assembled causes the center of gravity of the disc stack assembly 200 to shift from its axial center line 720 in the second bias direction 710.

As can be seen in FIG. 7, the second bias direction 710 is directly opposes the first bias direction 700. Another way of looking at this is that the imbalance of the disc stack assembly 200 is being countered by the imbalance of the disc spacers 210. In a disc drive using one disc spacer, the imbalance will be countered by the center of mass shift in a single spacer ring 210. Another way of putting this is that the mass imbalance or center of gravity shift from the center line access 420 is being used to counter-balance a similar shift in the disc stack assembly 200. As shown in FIG. 7, the disc spacer 210 is positioned to counter-balance a mass offset in the disc stack assembly 200.

If the flat surface 210 is formed so that the flat surface includes a tangent of the inner or outer diameter of the disc spacer, some interesting relationships are formed which can be useful in the balancing process. Once the mass offset of the spindle assembly is determined, a plane including the center line access 720 of the disc stack assembly 200 and the center of gravity of the disc stack assembly can be formed. Moving the disc spacers 210 or disc spacer 210 to a position where the center of mass of the disc assembly is counter-balanced by the center of mass shift in the disc spacer rings results in the flat surface 212 intersecting the plane defined by the axial center line 720 of the disc stack assembly 200 and a point associated with the mass offset of the disc stack assembly 200. If the flat surface includes a tangent to the inner or outer diameter of the disc spacer ring 212, the flat surface will essentially be perpendicular to the plane defined by the center line axis of the disc stack assembly 200 and the point including the mass offset of the disc stack assembly.

Figure 8:
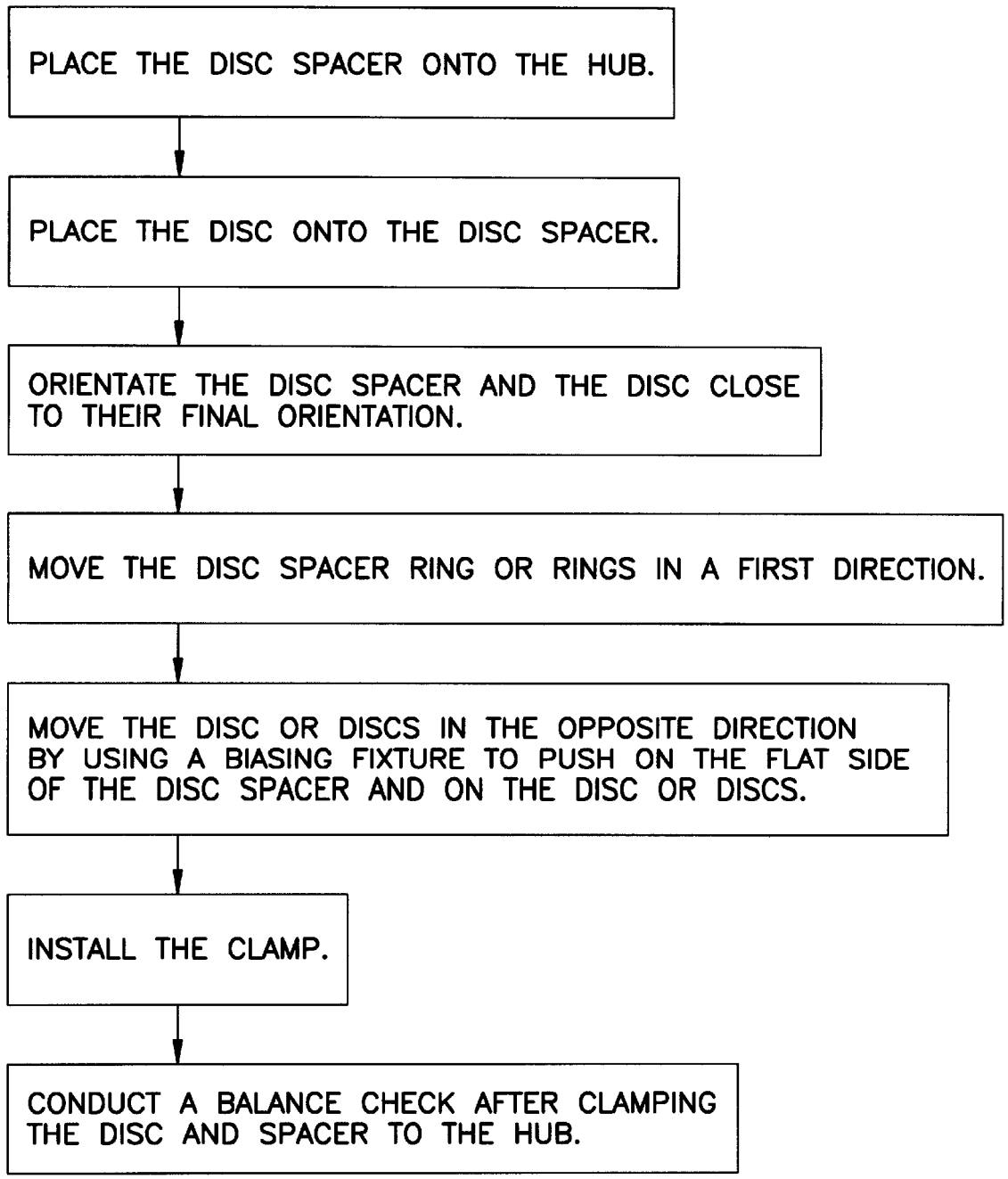
FIG. 8 is a flow chart of the method of performing the balancing of the disc stack.

FIG. 8 is a flow chart of the method for making the disc stack assembly 200 and balancing of the disc stack assembly 200. In operation, a machine for assembling disc stacks initailly places the spacer 210, and then the disc 134 onto the spacer 210 on the hub 133, as depicted by reference numbers 800 and 810, respectively. The disc spacer or spacers 210 are placed by automated machine in the orientation very close to its final orientation, as depicted by reference number 820. The disc 200 is placed by automated machine on top of the spacer 210. A biasing fixture, associated with the automated machine, biases the flat side of the disc spacer 210 in a first direction as depicted by reference number 830. The biasing fixture also biases the disc or discs 134 in the opposite direction, as depicted by reference number 840. As the biasing fixture pushes the flat side of the disc spacer 210, the disc spacer 210 self aligns to the optimal orientation. This biases the spacer 210 and disc 134. The clamp 220 is then installed, as depicted by reference number 850. A balance check is done after clamping the disc 134 and spacer 210 to the hub 133, as depicted by reference number 860.

Advantageously, the asymmetrical disc spacer can be used to balance a disc stack which has only one disc. In addition, the asymmetrical disc spacer can also be used to balance a disc stack which has a plurality of discs. The method is easy to use. This eases assembly and eases the manufacturing process. The method also generates minimal particles since the disc clamp is not machined during the balancing process and the flat side is formed to be a registration surface. The flat side provides a simple but effective way of allowing the tool that performs the disc spacer offset to engage on the surface and at the same time automatically align the spacer in the desired orientation. The asymmetrical disc spacer also minimizes material wastage which reduces the cost of the part.

Figure 9:
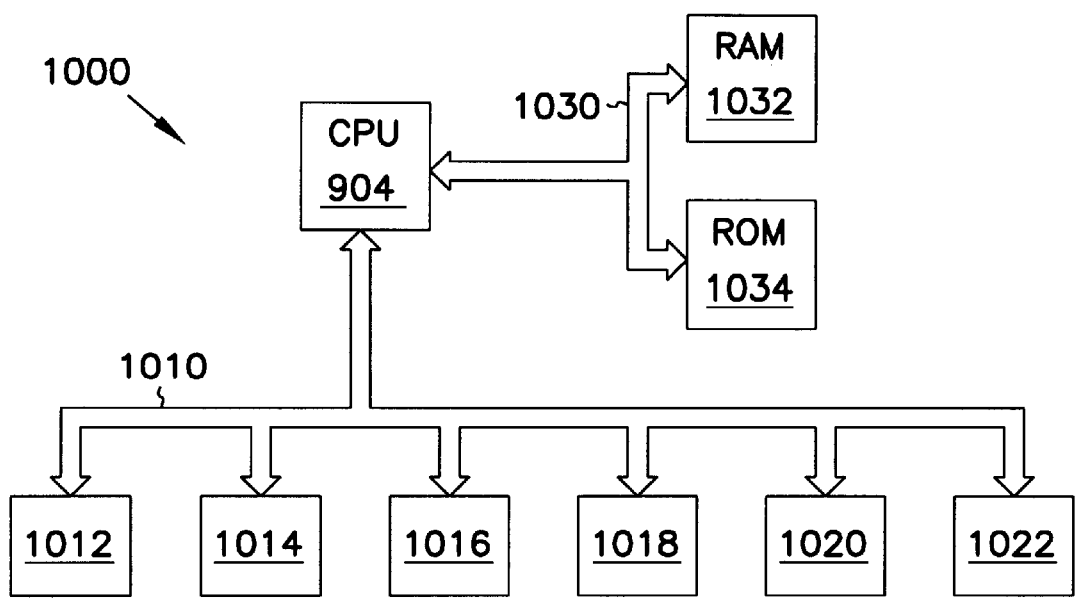
FIG. 9 is a schematic view of a computer system.

FIG. 9 is a schematic view of a computer system. Advantageously, the invention is well-suited for use in a computer system 1000. The computer system 1000 may also be called an electronic system or an information handling system and includes a central processing unit, a memory and a system bus. The information handling system includes a central processing unit 1004, a random access memory 1032, and a system bus 1030 for communicatively coupling the central processing unit 1004 and the random access memory 1032. The information handling system 1002 includes a disc drive device which includes the ramp described above. The information handling system 1002 may also include an input/output bus 1010, and several peripheral devices, such as 1012, 1014, 1016, 1018, 1020, and 1022 may be attached to the input output bus 1010. Peripheral devices may include hard disc drives, magneto optical drives, floppy disc drives, monitors, keyboards and other such peripherals. Any type of disc drive may use the slider having the surface treatment discussed above.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A disc stack assembly for use in a disc drive, said disc stack assembly rotated within the disc drive, the disc stack assembly comprising:

spindle hub rotatably coupled to the disc drive for providing an axis about which the disc stack assembly rotates, said hub including a substantially cylindrical portion;

a clamp;

an asymmetrical disc spacer having an opening therein dimensioned to receive the cylindrical portion of the spindle hub, said opening having an axial centerline, the asymmetrical shape of the disc spacer producing a shift in the center of mass of the disc spacer from the axial centerline, the asymmetrical shape being a flat surface including a chord of the outer perimeter of the disc spacer; and a disc coupled to a hub, said disc spacer positioned so that the shift in the center of mass of the disc spacer counter balances a mass offset in the disc stack assembly.

2. The disc stack assembly for use in a disc drive of claim 1, said asymmetrical disc spacer including a registration surface.

3. The disc stack assembly for use in a disc drive of claim 1 wherein the disc stack has a disc stack axial centerline, said flat surface of the asymmetrical disc spacer positioned so the flat surface intersects a plane, said plane including the disc stack axial centerline assembly and the mass offset in the disc stack assembly.

4. The disc stack assembly for use in a disc drive of claim 1 wherein the disc stack has a disc stack axial centerline, said flat surface of the asymmetrical disc spacer positioned so the flat surface is substantially perpendicular to a plane, said plane including the disc stack axial centerline assembly and the mass offset in the disc stack assembly.

5. The disc stack assembly for use in a disc drive of claim 1 wherein the asymmetrical disc spacer is positioned to counter balance a mass offset of the disc.

6. The disc stack assembly for use in a disc drive of claim 1 wherein the asymmetrical disc spacer includes a mass offset, said asymmetrical disc spacer positioned to counter balance a mass offset of the disc.

7. A disc drive comprising:

a base; and a disc stack assembly rotatably attached to the base for use in the disc drive, said disc stack assembly rotated within the disc drive, the disc stack assembly further comprising:

a spindle hub rotatably coupled to the disc drive, said spindle hub rotating about an axis, said spindle hub including a substantially cylindrical portion;

a clamp;

a disc coupled to a hub, said disc stack assembly having a center of mass offset from the axis about which the spindle hub rotates;

an asymmetrical disc spacer positioned to counter balance the mass offset of the disc stack assembly, wherein the disc spacer includes a substantially flat registration surface including a chord of the outer perimeter of the disc spacer.

8. The disc drive of claim 7 wherein said disc spacer has an opening therein dimensioned to receive the cylindrical portion of the spindle hub, said opening having an axial centerline, said disc spacer having a disc spacer center of mass offset from the axial centerline of the opening in the disc spacer.

9. The disc drive of claim 8 wherein the disc spacer center of mass is opposite the center of mass offset of the other portions of the disc stack assembly.

10. The disc drive of claim 8 wherein the disc spacer center of mass is on one side of the axis of rotation of the hub and the center of mass of the other portions of the disc stack assembly is on the other side of the axis of rotation of the hub.

11. The disc drive of claim 7 wherein the registration surface is used to position the disc spacer so that the disc spacer center of mass counteracts the center of mass offset of the other portions of the disc stack assembly.

12. The disc drive of claim 7 further comprising a plurality of disc spacers.

13. The disc drive of claim 12 further comprising a plurality of discs.

14. A disc stack assembly for use in a disc drive, said disc stack assembly rotated within the disc drive, the disc stack assembly comprising:

spindle hub rotatably coupled to the disc drive for providing an axis about which the disc stack assembly rotates, said hub including a substantially cylindrical portion;

a clamp;

a first asymmetrical disc spacer having an opening therein dimensioned to receive the cylindrical portion of the spindle hub and having an asymmetrical feature including a chord of the outer perimeter of the disc spacer;

a second asymmetrical disc spacer having an opening therein dimensioned to receive the cylindrical portion of the spindle hub and having an asymmetrical feature; and a disc coupled to a hub, the first disc spacer and the second disc spacer positioned so that the asymmetrical feature of the first disc spacer and the asymmetrical feature of the second disc spacer are in substantially the same circumferential position with respect to the spindle hub.

15. The disc stack assembly of claim 14 wherein the asymmetrical feature of the first disc spacer and the assymmetrical feature of the second disc spacer are substantially aligned.

16. A disc drive including a disc stack assembly for use in the disc drive, said disc stack assembly rotated within the disc drive, the disc stack assembly comprising:

a spindle hub rotatably coupled to the disc drive, said spindle hub rotating about an axis, said spindle hub including a substantially cylindrical portion;

a clamp;

a disc coupled to a hub, said disc stack assembly having a center of mass offset from the axis about which the spindle hub rotates:

a disc spacer having
 a first major surface; and
 a second major surface, the disc spacer having an asymmetrical feature therein positioned between the first major surface and the second major surface of the disc spacer, the asymmetrical feature including a chord of the outer perimeter of the disc spacer, wherein the disc spacer is positioned to counter balance the mass offset of the disc stack assembly.

* * * * *

UNITED STATES PATENT AND TRADEMARK OFFICE
CERTIFICATE OF CORRECTION

PATENT NO. : 6,288,867 B1  Page 1 of 1
DATED : September 11, 2001
INVENTOR(S) : Jierapipatanakul et al.

It is certified that error appears in the above-identified patent and that said Letters Patent is hereby corrected as shown below:

Title page,
Item [56], under "Reference Cited" and "U.S. PATENT DOCUMENTS" insert:
-- 4,224,648   9/1980   Roling.....................360/97
    4,358,803   11/1982  Van Der Geissen.........360/99
    4,683,505   7/1987   Schmidt et al..............360/98
    5,548,457   8/1996   Brooks et al...............360/98.08   --.

Column 6,
Line 13, after "flat" insert -- surface --.
Line 62, after "710" delete "is".

Column 7,
Line 27, delete "initailly" and insert -- initially --, therefor.

Column 10,
Lines 16-17, delete "assymmetrical" and insert -- asymmetrical --, therefor.

Signed and Sealed this

Second Day of July, 2002

Attest:

Attesting Officer

JAMES E. ROGAN
Director of the United States Patent and Trademark Office